Sept. 7, 1965     R. C. EHLERT     3,205,355
MOISTURE GAGE STANDARDS
Filed March 21, 1963

INVENTOR.
RALPH C. EHLERT
BY
ATTORNEY

États-Unis Patent Office 3,205,355
Patented Sept. 7, 1965

3,205,355
MOISTURE GAGE STANDARDS
Ralph C. Ehlert, Milwaukee, Wis., assignor to General Electric Company, a corporation of New York
Filed Mar. 21, 1963, Ser. No. 266,963
14 Claims. (Cl. 250—83)

This invention relates to checking and standardizing instruments that use radiant energy for measuring the water content of a sheet of paper at some stage during the paper making process. In particular, the invention is directed to the preparation and use of standards that simulate the combined effect of the water and paper on the radiation so they may be substituted for wet paper in order to check the stability of the instrument at desired intervals. In its broadest concept, the invention is applicable to instruments that employ electromagnetic radiation to measure continuously the amount of a water sorbed by an organic material.

Examples of such instruments, commonly called gages as will be done hereinafter for brevity, are those which couple microwave, visible light or infrared radiation with the material being gaged so that detected differences in the amount of radiation transmitted through the material or back scattered, reflected or otherwise attenuated by it serves as an indication of variations in the water content of the material.

When gages of this type are used on-the-line as in the paper industry, it is desirable that their precision be checked periodically. This has been done in the past by severing a sample from the sheet and bringing it to the laboratory where its wet and dehydrated weight are determined. Any discrepancy between the amount of water indicated by the weight difference and the amount of water indicated by the gage is then corrected by suitably adjusting the gage.

A handicap of this procedure is that the sample exchanges moisture with the atmosphere very rapidly. Hence, it must be transported to the laboratory in a sealed container and hastily analyzed in a controlled environment in order to get a satisfactory measurement. If a variance is found between actual moisture and the amount measured in the laboratory, many thousands of feet of paper, whose moisture content is erroneously determined, will have traversed the machine during the test period. If the operator is provided with knowledge about the amount of error, he still has no convenient way for introducing the proper correction except by trial and error that necessitates additional tests in order to be sure that the gage is reading properly.

It has been found infeasible to interpose a paper sample of known moisture content in the gage head for checking gage readout because percent of moisture in the sample changes rapidly with environmental conditions and the error involved in this procedure may be greater than the real error in the gage. It is difficult to preserve such a test sample in a stable condition for use hours or even months after initial gage calibration. And, in reality, the problem is made more severe by the requirement that at least two such samples are desirable in order to check the gage at two calibration points; that is, the gage should be checked for sensitivity and calibration at high and low moisture readings to make certain it is reading precisely and with the expected degree of linearity over its intended operating rate.

A general object of the present invention is the provision of a means and method for conveniently standardizing a gage of the character mentioned above.

A more specific object is to provide standards that may be substituted for the material in which the quantity of water is being measured and which will produce gage readings corresponding with a definite quantity of water in the material, to the end that the gage readout may be checked for precision and accuracy.

A further object of this invention is to illustrate use of the concept of selecting a material for a standard which is different than either the sorbed substance or the material being gaged but which simulates the combined effect of the substance and material on the radiant energy being used in the gage. An adjunct of this object is the provision of standards that are essentially unaffected over long periods of time by changes in environmental conditions such as temperature, humidity, physical state or by any other environmental effects that would change the value their output signals when they are substituted in the gage from time to time.

Stated in another way, it is an object of this invention to provide standards whose net effect when placed in the radiation gage head is to yield the same output indications as if the less stable material being subjected to continuous analysis were in the gage head. In some instances, as will appear hereinafter, this object entails use of standard materials that exhibit the same vibrational-rotational resonance phenomenon, absorption and reflectance as does the material being gaged.

Achievement of the aforegoing and other more specific objects will appear from time to time throughout the course of the following specification.

In general terms, the invention is applicable to gages that either transmit or reflect radiation from the material whose water content is being measured. For the sake of convenience and brevity, use of the new standards will be described in connection with a gage that employs infrared radiation to measure the quantity of water in organic materials such as cellulosic paper or textiles. In the illustrative gage, infrared radiation in two specific wavelength bands is reflected from the surface of the material. Pulses of a radiation in each band are consecutively detected and a continuous waveform electric signal is produced. This is amplified and converted to a D.-C. signal in a demodulator whose output voltage magnitude is related to the amount of moisture present in paper.

Components of a gage system are subject to physical changes and electronic drift over a period of time and variations in the output of the gage caused thereby must be corrected. To achieve this end, the new standard samples may be substituted in the radiation beam, the gage readout noted, and suitable adjustment made to bring it back to the readout it had when originally calibrated. The various compositions suitable for use as standards will be discussed in detail below. A more specific description of the invention and a typical gage system in which it may be employed will now be set forth in conjunction with the drawings in which:

Figure 1:
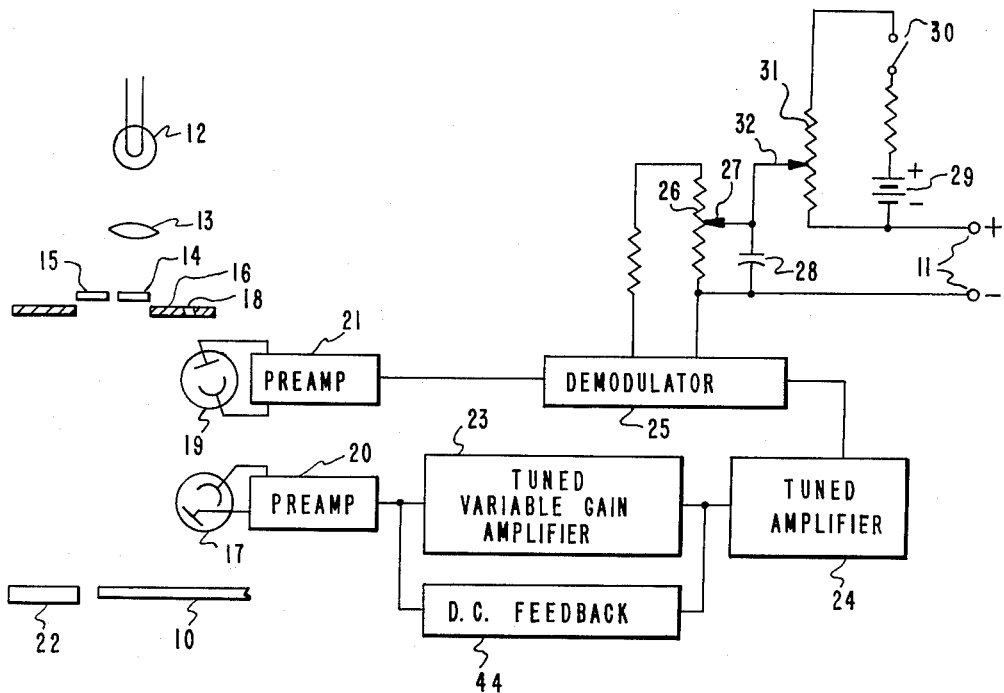
FIG. 1 is a schematic representation of an infrared or visible radiation gage that is especially suitable for measuring moisture content in paper and textiles.

In FIG. 1 there is shown a sheet of paper 10 which may be traversing a paper making machine at speeds up to 2500 feet per minute. It is desired to determine the moisture content of a paper on a continuous basis. For that purpose the paper making machine, not shown, is provided with heaters for removing more or less water from the paper, depending on whether it is too wet or too dry. Electric signals that are indicative of the moisture content of the paper as measured by the gage may be used to control heat or moisture application as required or the quantity of moisture may merely be determined visually through a meter or recorder, not shown, but which may be connected to output terminals 11 at the right side of FIG. 1.

A schematic representation of the gage head is seen to include an incandescent lamp 12 and a collimating lens 13 which projects a parallel beam of light toward paper 10.

It is desired to pass only two infrared bands of radiation to the paper, however, so there are provided a pair of interference filters 14 and 15 which are mounted on a rotatable wheel 16. Filters 14 and 15 are preferably placed near the center of rotation so that one or the other of them will be in the beam without interruption. Wheel 16 may be rotated at 10 revolutions per second by any suitable motor means, not shown. With this arrangement, pulses of infrared radiation at the two different wavelengths impinge on the upper surface of paper 10 in rapid succession. For measuring water in paper, the filters 14 and 15 may be selected to pass a band centered at 1.94 microns infrared radiation and another at 1.80 microns, respectively. Radiation in each band is reflected from the surface of the paper and their separate intensities are detected by a detector 17 which is shown as a photocell but which may be any suitable infrared detector such as a solid state lead sulphide cell.

In this example, 1.94 micron infrared radiation is chosen because it coincides with an absorption band of water sorbed by paper. This means that the amount of this radiation that is reflected by the paper will vary in accordance with water content and the electric signals from detector 17 will vary accordingly. The 1.80 micron band is chosen because it is apart from an absorption band for water and its reflected intensity is, therefore, relatively unaffected by changes in water content. Thus, the shorter wavelength radiation serves as a reference since its magnitude will change substantially only due to causes other than variations in water content, such as fluctuations in the intensity of the light source 12 or changes in the distance between the source and the paper.

Disk 16 is provided with a substantially semi-circular slot 18 which passes a beam of light directly from source 12 to another photocell 19. The purpose of this is to provide another signal for synchronously demodulating the alternating signals produced by photocell 17. An integrating sphere, not shown, may also be used for collecting the reflected radiation viewed by photocell 17. For more details on a gage such as that here being discussed, reference may be made to the co-pending application of R. Ehlert, Serial No. 143,749, filed October 9, 1961, now Patent No. 3,150,264, and assigned to the assignee of the instant invention.

The output signals from photocells 17 and 19 are amplified in their respective preamplifiers 20 and 21. Preamplifiers 20, 21; photocells 17, 19; disks 16; filters 14 and 15; collimating lens 13; and light source 12 constitute an entity designated a gage head. This apparatus may be suitably mounted in a stationary position over paper 10 or it may be adapted to traverse over the width of the paper if desired. The traversing mechanism is not shown because it is not essential to understanding the present invention. Omitted from the gage head are the shields which prevent extraneous light from being sensed by detector 17 or 19. There is shown in FIG. 1 a symbolized reference standard 22 which constitutes the present invention. It is to be understood that during calibration of the gage, the head may be moved laterally over paper 10 so as to bring the beam of radiation emanating from source 12 into alignment with reference standard 22 or standard 22 may be moved over the top surface of the paper into alignment with the beam.

Emerging from preamplifier 20 is a continuous train of electric signals of essentially semi-sinusoidal form. The first in the series of pulses may be due to the intensity of radiation from the long wavelength and the second may be due to the short wavelength radiation which is reflected from the paper. These consecutive pulses are fed over a cable, which may be 40 feet or more long, to a tuned variable gain amplifier 23 at a readout station. The ultimate aim of the electronics is to obtain an integrated difference between the consecutive pulses that will serve as an indication of the variations in the amount of moisture present in the paper. To achieve this, variable gain amplifier 23 is adapted to produce the same level of output signal regardless of the magnitudes of the input signals. Thus, the proportionality between the consecutive pulses is maintained although their net difference is increased in the process of amplification. Part of the alternating output from amplifier 23 is used to stabilize it through the agency of D.-C. feedback accomplished with a device 44 that includes a filter-rectifier combination. The output from amplifier 23 is further amplified in a tuned amplifier 24 which feeds into a demodulator 25. The latter also receives synchronizing signals from detector 19 in the gage head.

Included in demodulator 25 is a paraphase amplifier from which cathode and plate signals are taken that are 180° out of phase with each other. These signals operate a synchronous relay, not shown, through whose contacts the alternating waves from tuned amplifier 24 is passed into an integrating circuit not shown. The integrating circuit produces a D.-C. output voltage which is applied to a dividing resistance 26 that has an adjustable contact 27 and a smoothing capacitor 28. The position of contact 27 determines the slope of the calibration line of the gage. That is, its adjustment affects the slope of the line that represents the relation betwen output voltage and percent moisture in the paper.

Means are also provided for establishing the initial or zero point of the gage output. These includes a D.-C. source 29 in series with a limiting resistor and a switch 30 which are connected across a potentiometer 31 on which there is an adjustable arm 32. It can be seen readily that the position of contact arm 32 determines the amount of voltage that opposes the voltage derived from potentiometer 27 so that a zero point or zero moisture condition can be pre-set. The net output signal, this is indicative of the amount of water in the paper, appears on terminals 11 which may be connected with a direct reading meter, a recorder or other electro responsive device, not shown.

The conventional procedure for calibrating gages of this type is to insert a series of samples ranging from dry to wet in the beam, noting their corresponding output signals on a recorder, and then quickly determining their moisture content in the laboratory by weighing, drying, re-weighing and subtracting the weights. It is readily apparent that this procedure may be tolerable at initial installation, but it would not be convenient nor desirable to repeat the performance each time the operator wants to make a determination of whether the gage is reading precisely as it did at original calibration.

To overcome this difficulty, the present invention proposes to provide stable standards that can be used at any time to check and compare the output of the gage with its original calibration. A suitable standard must cause the same output signal by the gage at any time in the life of the gage. It must be unaffected by time or changes in its environmental condition such as in temperature or humidity. When presented to the gage head it must have the same effect as the combination of the substance and the material being gaged rather than just the substance alone. It must be rugged and unaffected by physical handling. In infrared and microwave gages, the standard should include a compound or radical that a vibrational-rotational resonance quality that is comparable with the resonant band for the combination of the water and material being measured. The total effect of the standard should be the same as the effect of the water and material being gaged. Moreover, it is usually desirable that at least two standards be provided, one for checking calibration corresponding with low percentages of water and another for high percentages, to the end that the gage may be checked near the limits of its operating range.

Figure 2:
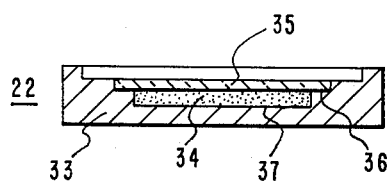
FIG. 2 is a cross-section of a reference standard employing the principles of the present invention.

As seen in FIG. 2, the standard holder may take the form of a counterbored disk 33 of a metal such as aluminum. The reference standard material 34 may be deposited in a recess as shown and an infrared transmitting window such as glass 35 or other transparent non-hygroscopic material may be placed over it. On shoulder 36, which supports glass 35 at its margin, there may be applied an adhesive that maintains the moisture tight integrity of the standard. A suitable adhesive is known by the trade name "Hysol" sealant and is an epoxy resin material. In one commercial embodiment, metal disk 33 is about five inches in diameter and the reference standard material 34 constitutes a pellet of about two inches in diameter.

To preserve stability of the sample, to improve uniformity and to avoid the effects of surface condition variations, it is desirable to form the pellet 34 under pressure, in a hydraulic press, for example, in which case a solid pellet is formed that has these attributes and facilitates handling. Forming at pressures of 3000 p.s.i. has been found satisfactory in most instances. The pellet 34 may be formed bodily with disk 33 in a hydraulic press or it may be formed separately and mounted in other containers such as thermal setting plastics. The pellet may also be set in a resilient material that lines a recess, such as that in which it resides in FIG. 2, and the glass window may press the pellet against the resilient material. Many suitable containers for hermetically sealing a reference standard should now suggest themselves. The proper design for a standard holder will, of course, depend upon the type of gage in which it is to be utilized.

In gages where transmission of radiation through the material being gaged is to be simulated, it is necessary to design the sample holder for transmissibility. This can be accomplished by placing another window 35 on the opposed face of pellet 34 instead of having the container 33 with a solid bottom as shown.

In general, to calibrate any gage a pair of standards is required, one for low percentages of the substance in the material and the other for high percentages. This facilitates establishing the proper slope of the calibration curve. It is also necessary to have different pairs of standards for different ranges of water and different types of paper. For example, different standards are required for measuring water in kraft paper than are required for water in facial tissue or newsprint with an infrared gage. If the gage is one that uses infrared radiation at two different wavelengths as does the one described above, the standard should simulate the effect of the waterpaper combination for both wavelengths.

When the quantity of water in paper is being gaged, good results have been obtained by simulating the waterpaper combination with standards that include compounds which have —OH radicals either bound to metallic elements as hydroxides or that appear in the water of hydration of a salt.

For use with an infrared gage that was calibrated for measuring the quantity of water in a paper like that used to make facial tissue, a suitable low range standard consisted of about a three square inch pellet of bismuth hydroxide formed with a total load of 10,000 pounds. Other suitable hydroxides for simulating different percentages of water in papers having basis weights dissimilar to tissue are the hydroxides of sodium, magnesium, calcium, lithium, zinc, cesium, indium, potassium and platinum. This enumeration may not be all inclusive but it is believed to include materials for standards which would cover a wide range of moisture contents for papers of various compositions. In the gage described above, a pure bismuth hydroxide standard is used to simulate the conditions which are equivalent to kraft paper having a four percent moisture content, for example. This is considered the low standard in view of the gage being adapted to read moisture contents over the range of zero to 15 percent of total weight of water with respect to water plus paper.

As a further example, a suitable high standard for simulating kraft paper was made by mixing four percent of zinc hydroxide and ninety-six percent of magnesium oxide by weight and pelletizing the mixture at about three thousand pounds per square inch. The usual range of hydroxide required for both high and low standards is one to ten percent of hydroxide with respect to the total weight of hydroxide and filler. A fundamental rule is that the amount of filler to be used is that which causes the standard to yield a readout value within the range of the gage.

The standard substances that use compounds including a hydroxyl radical are usually used in pure form and they have been shown to respond like moist paper to both the 1.80 and 1.94 micron infrared radiation.

Suitable high moisture content standards have been made with hydrated salts mixed with another material. Because of their water of hydration, the hydrated salts exhibit intense absorption at the 1.94 band and as such they are not suitable for standards by themselves. They are useful, however, for making very easily controlled standards by mixing them in various proportions with non-hydrated magnesium oxide. A good high standard was made of magnesium sulphate having seven molecules of water of hydration with magnesium oxide filler. Mixtures of different salts, hydroxides and fillers may also be employed to obtain exact duplication of some paper-water combinations. Other hydrated salts that may be formed into a standard with magnesium oxide or other fillers are as follows:

(1) Acetates of barium, cadmium, cesium, magnesium and copper.
(2) Benzoates of barium, calcium, cesium, cobalt and copper.
(3) Bromide of nickel.
(4) Cholorides of barium, calcium, copper, magnesium, and platinum.
(5) Chromates of calcium and magnesium.
(6) Citrates of calcium and cobalt.
(7) Gluconates of barium and calcium.
(8) Iodides of aluminum and cobalt.
(9) Lactate of bismuth.
(10) Nitrates of calcium, cesium, chromium, indium, and magnesium.
(11) Nitrite of barium.
(12) Oxalates of barium, calcium and iron.
(13) Oxides of barium, bismuth and calcium.
(14) Phosphates of barium and cobalt.
(15) Propionates of barium and calcium.
(16) Sulfates of barium, cadmium, calcium, cesium, iron, aluminum, and magnesium.
(17) Sulfites of iron and magnesium.
(18) Tartrates of bismuth and calcium.

In general, any hydrated salt that is stable in the intended environment, which may be as high as 100° C. in a paper making machine, and which gives the desired gage output for the wavelengths at which it operates, will be suitable.

Figure 3:
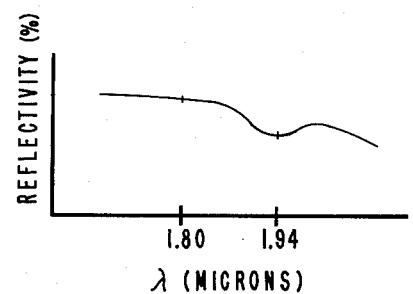
FIG. 3 is a wavelength-intensity distribution curve that is useful for explaining the invention.

In FIG. 3 there is shown a graph of the percentage of reflected infrared radiation versus infrared wavelength in microns for a typical standard material. It will be observed that when this standard is in the beam, the reflected intensity of the shorter wavelength is not greatly different than the reflected intensity of the longer wavelength radiation. The standard is designed so that these intensities agree very closely with the intensities obtained for the same wavelengths when the material being gaged is in the primary infrared beam. Thus, the successive pulses due to the different wavelengths detected by photocell 17 are essentially the same height whether the standard or the sample being measured is in the gage. By plotting intensity versus wavelength curves, as in FIG. 3, for various quantities of sample substances or mixtures thereof, and by doing the same for the material being gaged, optimum standard characteristics can be obtained. The standard can then be reproduced for use in connection with any similar gage and material for which the standard was originally made. Of course, as pointed out above, preparation of both low and high standards is desirable.

Note in FIG. 3 that the curve representing reflectivity or backscatter of the standard is relatively flat in the region of the reference wavelength, 1.80 microns, which means that the intensity from the standard remains sufficiently constant even if there is some difference between wavelengths that are passed in different gages. The curve dips in the region of the moisture measuring wavelength, probably due to resonance of the water of hydration or the hydroxyl radical in the standard. It is desirable that the standard be designed so that the relatively flat bottom part of the dip coincides with the measuring wavelength. Otherwise minor shifts in the wavelength would cause greater than desired intensity changes and this would make it more difficult to use the same standard in another gage even though it be of essentially the same character.

Standards that yield reflectivity versus wavelength curves that are more nearly V-shaped in the region of the 1.94 micron, or other measuring wavelength, are also useful, however, provided the reference wavelength lies on an essentially flat part of the curve. Such standards are satisfactory for use in a specific gage wherein the band passed by the filter in the moisture measuring beam is certain to remain the same. That is, it doesn't make any difference if the reflected intensity would be a little different for a small wavelength shift because the shift cannot occur as long as the same filter is being employed when the gage is standardized from time to time.

Standards of the type alluded to in the preceding paragraph have been prepared containing benzamide $$(C_6H_5CONH_2)$$

and succinamide . These materials give repeatable results for the ratio of energy reflected at 1.94 microns to that reflected at 1.80 microns. The ratios fall within the range of values observed for kraft paper having a basis weight of forty pounds per three thousand square feet and a moisture content of between two and twelve percent. It is believed that these and other amides simulate water in an organic material primarily because of resonance by the $NH_2$ radical within the wavelength bands being employed. Other elements present in these compounds probably modify the effect produced by the radical so that the total effect of the standards is the same as if radiation were reflected by paper of a particular basis weight and water content range.

It may now be seen that the essence of the invention is the making of standards that yield a comparable effect, when placed in the gage head, as does the material whose moisture content is being gaged. In general, any compound that includes a radical or complex which has a resonance characteristic that produces the net effect, by itself or in combination with other materials, of water in the material being gaged for the type of radiation used in the gage, fulfills the basic concept of the invention.

Standards may be made in forms other than those discussed above. For instance, it is not imperative that the standard material be pelletized for it can be used in powdered form in a container such as that shown in FIG. 2. When a powdered material is used, however, it is necessary to compact it sufficiently so that its surface condition will not be altered due to handling or this will give inconsistent results when the reference is inserted in the gage head on different occasions. To overcome this difficulty and to meet the standard requirements in particular cases, it has been found advantageous to entrain some standard materials in a plastic or viscose matrix. Because the matrix may have different coefficients of refraction and reflection than the standard material, it is desirable to minimize losses in some cases by underlying the sample material 34 with a radiation reflecting substance so that most of the radiation comes out of the reference standard container. By reference to FIG. 2 it may be seen the standard material 34 may be placed on a reflecting surface 37 if it is desired to increase the reflected radiation output. Copper, silver, gold, chromium and most metals are good infrared radiation reflectors. On the other hand, if transmission of the radiation through the specimen being gaged is to be simulated, a reflecting surface is not necessary.

In some instances, the same material can be used for both the high and low standards by making the layer 34 rather thin and using a reflecting surface 37 for one part of the range and omitting it for another. In any case, the thickness of the standard material 37 may be governed to some extent by type of radiation employed in the gage and whether it involves an essentially surface or depth phenomenon.

Although the basic phenomenon on which standard or material being gaged relies is stated as being a molecular vibrational-rotational resonance phenomenon, other physical factors may also come into play in the standard or material being gaged. For example, solid state phenomenon such as the presence of absorption edges, valence bands, trapping, electron jumps, and the effect of impurities may come into play. The extent to which these factors may be involved need not be known ordinarily.

The customary procedure for calibrating a moisture gage on the customer's premises is to place a series of paper samples with varying moisture contents in the beam and noting gage readout for each. After measurement, each sample's precise moisture content is determined by the method of taking differences between wet and dry weights. The plot of moisture content against readout is the calibration curve. The readouts may be obtained from a chart recorder which may be connected to output terminals 11 in FIG. 1 and which has its own zero, sensitivity and range controls. In the course of calibrating, the high and low moisture content simulating standards are placed in the gage and their respective readouts may be taken with a voltmeter across terminals 11. The respective voltages are noted and any time it is desired to check the gage itself for accuracy the standards may be consecutively returned to the gage head and, if there is any disagreement with the original readings, the slope and sensitivity controls 27 and 32 may be adjusted to make the correction. It is also possible to relate the standards to the readout appearing on the chart recorder which means that they can be coordinated with true moisture content rather than only with gage output voltage. The exact mechanics of calibrating the gage and using the new simulated standards will, of course, depend on the individual gage's features.

In summary, there has been described a method for standardizing radiation gages employing standards that simulate the material being gaged. The standards are physically and chemically stable and are not subject to the variations and uncertainties which are encountered when an attempt is made to use a portion of the material being gaged as a standard.

Although a variety of the new standards have been described and a preferred form of gage for utilizing them has been discussed, such description should be considered illustrative rather than limiting, for the invention may be variously embodied and is to be limited only by interpretation of the claims which follow.

It is claimed:

1. A standard for checking the precision of a gage that is adapted to measure the amount of water sorbed in a solid substance by detecting variations in attenuation of electromagnetic radiation coupled with the substance, said standard comprising:

(a) an inorganic compound that includes a hydroxyl radical and is in such proportion as to produce a comparable effect on radiation when placed in the gage as the joint effect produced by a particular organic substance that has sorbed a certain amount of water within the readout range of the gage, and (b) sealed container means holding said compound in a fixed physical form and protecting said material against interchange of moisture with its environment, (c) said container means including a transparent window means that transmits radiation into and out of the compound.

2. The invention set forth in claim 1 wherein said constituent is by a hydroxide selected from the group consisting of the hydroxides of bismuth, calcium, cesium, indium, lithium, magnesium, platinum, potassium, sodium and zinc.

3. The invention set forth in claim 2 including a mixture of said hydroxide and a filler.

4. The invention set forth in claim 3 wherein said filler is magnesium oxide.

5. The invention set forth in claim 1 wherein:
(a) said compound is a quantity of hydrated salt, and
(b) said salt is mixed with a filler.

6. The invention set forth in claim 5 wherein said filler is magnesium oxide.

7. A standard for checking the precision of a gage that is adapted to measure the amount of water sorbed in paper by detecting variations in the attenuation of infrared radiation coupled with the paper, said standard comprising:
(a) a mixture which includes a hydroxide,
(b) a filler, and
(c) sealed container means holding said mixture in a fixed physical form and protecting said mixture against interchange of moisture with its environment,
(d) said container means including a transparent window means that transmits radiation into and out of the mixture.

8. The invention set forth in claim 7 wherein the hydroxide constitutes 1 to 10% by weight of the mixture.

9. The invention set forth in claim 7 wherein said filler is magnesium oxide.

10. The invention set forth in claim 8 including a filler consisting of magnesium oxide.

11. A standard for checking the precision of a gage that is adapted to measure the amount of water sorbed in paper by detecting variations in the attenuation of infrared radiation coupled with the paper, said standard comprising:
(a) a mixture which includes a hydrated salt,
(b) a filler, and
(c) sealed container means holding said mixture in a fixed physical form and protecting said mixture against interchange of moisture with its environment,
(d) said container means including a transparent window means that transmits radiation into and out of the mixture.

12. The invention set forth in claim 11 wherein said hydrated salt constitutes 1 to 10% by weight of the mixture.

13. The invention set forth in claim 11 wherein said filler consists of magnesium oxide.

14. The invention set forth in claim 12 including a filler consisting of magnesium oxide.

References Cited by the Examiner

UNITED STATES PATENTS

| | | | |
|---|---|---|---|
| 1,014,601 | 1/12 | Looram | 73—335 |
| 2,667,425 | 1/54 | Bierly. | |
| 2,866,900 | 12/58 | Busignes | 250—43.5 |
| 2,868,062 | 1/59 | Haley | 88—14 |
| 2,940,360 | 6/60 | Carter | 88—14 |
| 2,979,410 | 4/61 | Parlour. | |
| 3,001,073 | 9/61 | Alexander | 250—83.4 |

RALPH G. NILSON, *Primary Examiner.*

JAMES W. LAWRENCE, *Examiner.*